United States Patent [19]

Horgan et al.

[11] 4,183,208

[45] Jan. 15, 1980

[54] FLUIDIZED BED GASIFIER

[75] Inventors: John J. Horgan, Wethersfield; Stuart Hamilton, Glastonbury, both of Conn.

[73] Assignee: United Technologies Corporation, Hartford, Conn.

[21] Appl. No.: 861,036

[22] Filed: Dec. 15, 1977

[51] Int. Cl.[2] .......................... F02B 43/08; F02C 3/22
[52] U.S. Cl. .................................. 60/39.12; 60/39.35
[58] Field of Search ................. 60/39.02, 39.12, 39.35, 60/39.46 S; 431/7; 34/57 D; 432/15, 58

[56] References Cited

U.S. PATENT DOCUMENTS

| | | | |
|---|---|---|---|
| 3,446,012 | 5/1969 | Foster-Pegg | 60/39.12 |
| 4,039,272 | 8/1977 | Elliott | 431/7 |
| 4,148,186 | 4/1979 | Virr | 60/39.35 |

Primary Examiner—Louis J. Casaregola
Attorney, Agent, or Firm—Norman Friedland

[57] ABSTRACT

An increase in the temperature of the gaseous working medium in a gas turbine engine fueled with coal-fired gasifier having a rotating fluidized bed, where the coal is fed radially inwardly through the bed toward the axis of rotation is obtained by including a secondary combustor. The gasifier is fed with compressor discharge air and is operated fuel rich by limiting the amount of compressor discharge air fed to the fluidized bed. The excess compressor discharge air mixes with the exhaust from the gasifier for further combustion resulting in an increase in the temperature of the gaseous working medium that is ultimately utilized for driving the turbine of the engine.

1 Claim, 3 Drawing Figures

FLUIDIZED BED GASIFIER

BACKGROUND OF THE INVENTION

This invention relates to gas turbine type power plants adapted for industrial use and particularly to a means for increasing the temperature of the products of combustion produced by a centrifugal fluidized bed gasifier burning coal.

As is well known in conventional fluidized bed combustors air is fed to flow vertically upward through a bed which consists of solid particles. The flow of air upwardly forms a fluidized bed and the range of velocities of the fed air causes minimum fluidization conditions up to the value at which particle elutriation occurs. One of the limitations to using fluidized beds when being considered for gas turbine power plants is the low relatively heat release rate.

It is recognized that fluidized bed heat release rates are governed by the Reynolds Number, velocities and residence time of the particles in the bed. Because the drag of the smaller coal particles is very high due to the large cross sectional area relative to their mass these particles elutriate before they are combusted which lowers combustion efficiency and poses a potential turbine erosion problem.

Also, of paramount importance is the size of the bed required. In order to achieve a heat rate obtained from combustion of coal in the range where it is efficient or practical to operate a gas turbine the size necessary for the fluidized bed is very large and costly. For example, a fluidized bed measuring say 70' high and 20' in diameter would be necessary to operate, say the FT-50 gas turbine engine manufactured by the Pratt & Whitney Aircraft division of United Technologies Corporation, the assignee. The large size of the pressure vessel also requires long, large connecting pipes which introduce further complications due to the size, thermal expansions and cost.

The problems noted above can be obviated by forming the combustor into a rotating fluidized bed and flowing the fluidizing air radially inwardly toward the axis of rotation so that the air passes through the centrifugally retained bed. By imparting a high acceleration to the coal particles when in the centrifugal field, the through flow velocity, and, therefore, the heat release rate can be substantially increased, elutriation can be minimized so that both small and large particles are consumed, making the direct burning of coal for gas turbine engine possible.

Further, by introducing additives, such as Dolomite directly into the fluidized stream of coal in a manner to cause a high centrifugal field coupled to the rotation of the fluidized bed, (mechanically or aerodynamically) the sulfur and ash can be removed during the combustion of the coal, resulting in a clean uncontaminated continuous flow of high temperature air. The temperature of the combustor exhaust air would be sufficiently high, say 1600° F. to drive the turbines of a gas turbine engine to produce power.

It is contemplated that for gas turbine power plant, say of the FT-4 or FT-50, both manufactured by the Pratt & Whitney Aircraft division of United Technologies Corporation, and using, for instance one combustor for the FT-4, or the case of the FT-50 using two combustors each combustor would produce between 20 and 30 megawatts of electrical or mechanical power. The active toroidally shaped fluidized bed would measure 8 feet in diameter, 2 to 2½ feet deep and 12 feet long. The case or drum retaining the bed would rotate around 200 rpm and combustion exhaust gas separator would rotate at a higher speed than the drum and would measure 2' in diameter.

To achieve a higher turbine inlet temperature, in accordance with this invention a gasifier and a secondary combustor are employed.

The gasifier is run fuel rich by limiting the compressor discharge air to the fluidized bed and the combustible gas produced by the gasifier is mixed with the excess compressor discharge air in a secondary combustor. We have found that by this system the turbine inlet temperature can be increased at least by 500° F.

SUMMARY OF THE INVENTION

A feature of this invention is to provide for a pressurized centrifugal fluidized bed gasifier burning coal fed under the bed for a gas turbine engine means for increasing the temperature of the process gaseous medium. The gasifier is fuel rich by limiting compressor discharge air to the fluidized bed and burning the fuel rich gases with the excess compressor discharge air in a secondary combustor.

Other features and advantages will be apparent from the specification and claims and from the accompanying drawings which illustrate an embodiment of the invention.

DESCRIPTION OF THE PREFERRED EMBODIMENT

While the preferred embodiment of this invention is described as being utilized with a gas turbine engine application as any one skilled in the art will appreciate, the centrifugal fluid bed gasifier may be utilized in other applications as for example, steam power plants, rocket engines, and the like. Further, it could be utilized in engines propelling air or ground mobile units as well as in stationary power plants.

Figure 1:
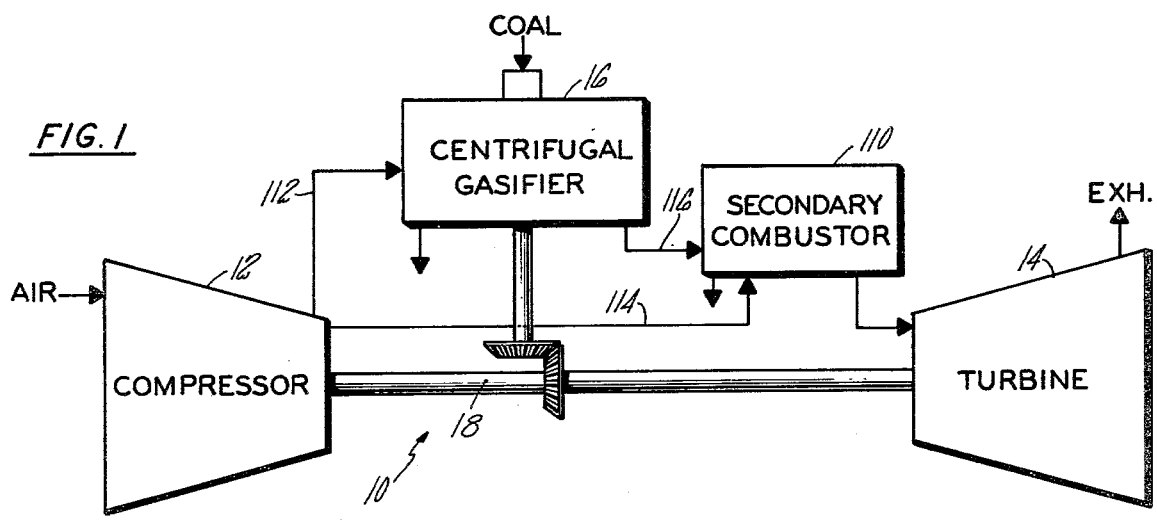
FIG. 1 is a block diagram representation illustrating a relationship of the centrifugal gasifier and secondary combustor for a gas turbine engine application.

As noted from FIG. 1, the gas turbine engine generally indicated by reference numeral 10 may be any suitable type as for example the FT-4, supra, comprising a suitable compressor section 12 and a turbine section 14 which may be coupled to the compressor via shaft 18 for driving the compressor. The excess power extracted from the turbine after driving the compressor can, as is well known, be utilized to drive a load, such as an electrical generator, gas pumps and the like.

By running the gasifier 16 (like reference numerals refer to like elements) fuel rich, i.e. by limiting the compressor air to the fluidized bed and mixing the excess air from compressor 12 with the hot gases produced by combustor 16 in the second combustor it is contemplated that the temperature of the gases admitted to the turbine would be increased 500°–700° F. to say from 1500° F. to over 2000° F. The secondary combustor would be similarly constructed to the gasifier, except the fuel feed elements would be eliminated. However, it would contain the means for removing the ash and spent dolomite.

In accordance with this invention as best shown in FIG. 1 a gas turbine engine utilizing the centrifugal gasifier produces a combustible gas that is further processed in secondary combustor 110. By running the gasifier 16 (like reference numerals refer to like elements) fuel rich, i.e. by limiting the compressor air to the fluidized bed via line 112 and mixing the excess air from compressor 12 (admitted to combustor 110 via line 114) with the hot gases produced by combustor 16 (admitted via line 116) in the second combustor 110 it is contemplated that the temperature of the gases admitted to the turbine would be increased 500°–700° F. to say from 1500° F. to 2000° F. Thus, in the gasifier the gasification process will break down the coal to a gaseous composition, but because of the limited supply of oxygen will not completely burn. The hydrogen and carbon monoxide gases given off by this combustor to the secondary combustor will combine with the excess compressor discharge air and complete combustion adding to the heat content. The secondary combustor 110 would be constructed similarly to others used to combust gases made from coal. These combustors are generally similar to conventional gas turbine combustors.

The gasifier exhaust could be fed through gas fuel injection elements and the compressor air would mix and combust with the gas in the secondary combustor, thus providing means for combining the air with the fuel to produce high turbine inlet temperatures.

An electrical motor 68, either obtaining its power source from the energy created by the turbine or from an external source serves to rotate the centrifugal gasifier 16.

Figure 2:
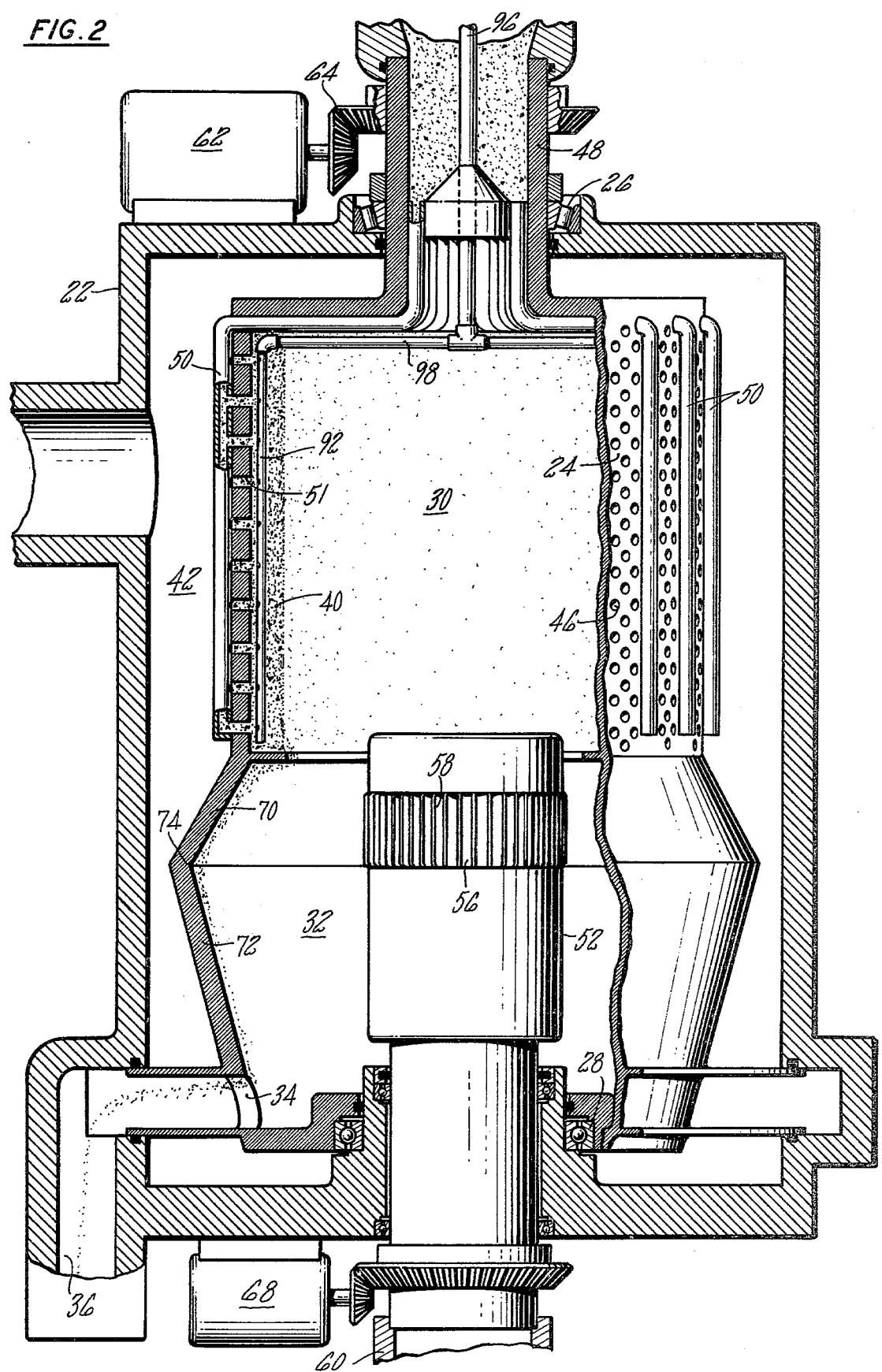
FIG. 2 is a view partly in schematic and partly in section illustrating the details of the centrifugal fluidized bed combustor.

The centrifugal gasifier may be seen by referring to FIG. 2 comprising a generally cylindrical shaped housing 22 rotatably supporting drum 24 by bearings 26 and 28.

Drum 24 is designed to have basically two sections, the upper section or gasification chamber 30 and lower section 32 divided by an annular projection. Gasification occurs in upper section 30 and the ash and residue, gravitates toward the bottom where it is collected and drained via the annular opening 34 communicating with the drain pipe 36.

The wall of drum 24 forming upper section 30 is fabricated from a suitable material, either metal or ceramic, or the like that is suitable to withstand the temperature generated by the burning of the fuel therein. Owing to centrifugal force created by the rotating drum the coal which may be relatively large granulated lumps as well as fine powdered coal, adheres to the inner wall 40 and builds-up into a layer of coal and ash defining the bed. Air, which in this instance is pressurized by the compressor is admitted into cavity 42 defined by the space between the inner wall 44 of housing 22 and drum 24, flows into the gasification chamber 30 through apertures 46 (if the wall is fabricated from ceramic, the porosity of the material would obviate the need of these apertures) for fluidizing the bed. The flow of air and centrifugal load on the bed is designed to produce a given heat release rate while achieving a minimum elutriation.

Coal is admitted to bed 41 by being fed through the reduced diameter portion 48 forward at the top of drum 24 which it is distributed to a plurality of circumferentially spaced pipes 50. Pipes 50, in turn, communicate with apertures 51 spaced vertically in upper section 30 of drum 24.

As is apparent from the foregoing the coal and air are radially admitted into the gasification chamber 30 and migrate through the bed toward the axis of rotation. As burning occurs the gas generated fills the upper sections 30 and lower section 32 and is collected through the collector pipe 52 extending vertically into the central portion of drum 24. A plurality of openings 56 which may have vane-like elements 58 formed adjacent thereto convey the heated gases through pipe 52 directly in communication with the turbine via connection 60. The vane constructed openings 56 serve to further filter the exhaust gases prior to being admitted to the turbine.

It is contemplated that the collection pipe 52 and drum 24 rotate at different speeds. Hence electric motor 62 through the gear arrangement generally shown at 64 drives drum 24 to say 200 rpm and electric motor 68 drives collector pipe 52 via the gear arrangement generally shown at 70 at preferably a higher speed.

Combustion would be initiated by igniting a liquid fuel at the outset. This fuel would be shut-off once combustion is sustained. By controlling the rotational speed of drum 24, particularly by use of a variable power source, such as by motor 62, it is possible to control fluidization of the bed and the power output of the combustor. By controlling the airflow to the gasifier along with the coal flow, the gasifier can be operated fuel rich changing its mode from a combustor to a gasifier. The gas produced can then be used in the secondary combustor.

As noted, the lower section 32 is designed with back-to-back frusto-conical sections 70 and 72 and the diameter at junction point 74 is greater than the diameter of the upper section 30. This design facilitates the collection of ash and sulfur by forcing these particles to migrate to the bottom.

An advantage of designing the fluidized bed such that the coal is admitted radially through the bed toward the axis of rotation is that it facilitates the admission of additives such as Dolomite which is mixed with the coal and hence, minimizes $SO_x + NO_x$.

While it has been shown that the bed is rotated mechanically it will be apparent to one skilled in the art that the bed can also be rotated aerodynamically.

Figure 3:
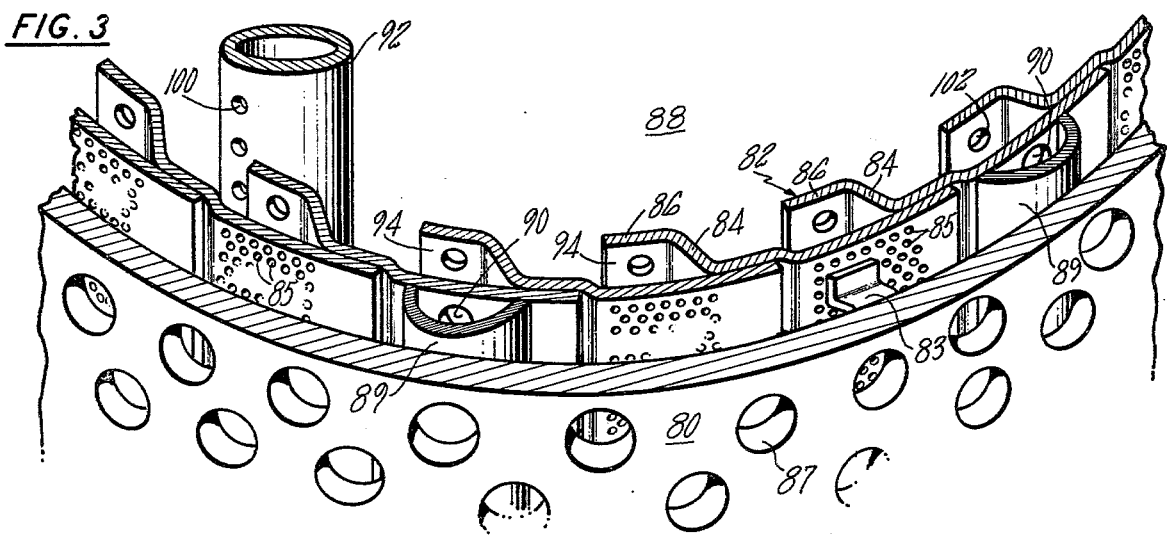
FIG. 3 is a partial view in perspective showing the details of a centrifugal fluidized bed combustor.

FIG. 3 exemplifies another construction of the drum which is shown as comprising a rotating cylinder 80 supported similarly to drum 24 of FIG. 1, spaced from the louvered constructed inner wall generally indicated by reference numeral 82. The rotating cylinder 80 and inner wall 82 are attached by support 83 so that both rotate together. However, it is to be understood that the outer cylinder 80 may not be necessary in certain applications.

Inner wall 82 consists of vertically extended louver elements 84 having an attaching surface for supporting an identical adjacent louver for defining the cylindrical wall surrounding the combustion chamber 88. Lip portion 86 of each louver element extends into the combustion chamber 88 and serves to feed the fuel as will be described hereinbelow. The fluidizing air trapped in the annular space between the rotating cylinder 80 and inner wall 82 flowing through openings 84 formed in rotating cylinder 80 is admitted into the bed via a plurality of small openings 85 extending vertically the length of the bed are formed on the surface of adjacent louvers intermediate the lip and attaching surface. These holes are sized sufficiently small so that small coal or additive particles are not forced therethrough as a consequence of the centrifugal force imparted to the particle in the rotating field.

Spaced about the circumference are vertically extending coal and sorbent feed manifolds 89 that are attached to the outer diameter of the inner wall 82. A plurality of vertically spaced holes 90 are in communication with the coal and sorbent feed manifold to introduce these coal and additives radially into the bed. As noted from FIG. 3 the vertical spaced openings 90 are aligned with the lip 86 of the louver element 82. The lip acts as a shield and protects the coal feed orifices from clogging by the fuel and process particles.

Stationary steam lancers 92 may be included to help keep the beds cleansed and prevent clogging particularly at the slots 94 formed by lip 86 and the back end of the adjacent louver element. The steam lancer, which is shown more completely in FIG. 2, has a stationary steam feed pipe 96 mounted coincident with the axis of rotation and extends through the reduced diameter portion 48. Branch feed lines 98 extend radially so that the steam lancers 92 are in juxtaposition with the bed.

Referring again, to FIG. 3, a plurality of vertically extending steam jet apertures formed in lancers 92 are aimed at the bed and align with spaced holes 102 formed in lip 86 at the fuel feed section. The steam penetrating these holes serve to dislodge and clean these fuel feed passages.

As is obvious to one skilled in the art the gasifier may be oriented other than vertically, as for example horizontally and could accept fuels other than coal, as lignite.

It should be understood that the invention is not limited to the particular embodiments shown and described herein, but that various changes and modifications may be made without departing from the spirit or scope of this novel concept as defined by the following claims.

We claim:

1. A gas turbine engine having a compressor, a turbine driving said compressor and a centrifugal coal-burning gasifier defining a first combustor generating hot gases for powering said turbine, means to rotate said gasifier means for generating a fluidized bed formed in a cylindrical wall in said gasifier, means for admitting coal into said gasifier through openings in said cylindrical wall and directing the coal from the outer diameter of said cylindrical wall toward its center, connection means supplying a portion of compressor discharge air to said first combustor for fluidizing said fluidized bed and supporting combustion centrally within said cylinder to combust said coal, means for increasing the temperature of the hot gases admitted to said turbine, said means including a secondary combustor interposed between said centrifugal gasifier and said turbine for receiving the hot gases generated thereby, and means for limiting the amount of compressor air to said fluidized bed so that the hot gases generated in said gasifier have a content of combustible gases and means for burning said combustible gases in said secondary combustor, and connection means interconnecting said compressor and said secondary combustor for supplying the remaining portion of compressor discharge air for supporting said combustion therein.

* * * * *